United States Patent [19]

Graber et al.

[11] Patent Number: 4,886,138
[45] Date of Patent: Dec. 12, 1989

[54] ELECTROMAGNETIC CONTROL APPARATUS FOR VARYING THE DRIVER STEERING EFFORT OF A HYDRAULIC POWER STEERING SYSTEM

[75] Inventors: David W. Graber, Millington; Andrzej M. Pawlak, Troy; Jeffery A. Zuraski, Saginaw, all of Mich.

[73] Assignee: General Motors Corporation, Detroit, Mich.

[21] Appl. No.: 288,661

[22] Filed: Dec. 22, 1988

[51] Int. Cl.[4] .................................... B62D 5/083
[52] U.S. Cl. .................... 180/142; 180/143; 180/148
[58] Field of Search ............... 180/132, 141, 142, 143, 180/148; 74/388 PS; 310/103; 142/0.02 R

[56] References Cited

U.S. PATENT DOCUMENTS

| | | | |
|---|---|---|---|
| 4,629,025 | 12/1986 | Brasier et al. | 180/142 |
| 4,765,427 | 8/1988 | Yonker | 180/143 |
| 4,778,021 | 10/1988 | Morishita et al. | 180/79.1 |
| 4,783,626 | 11/1988 | Shimizu | 324/208 |

FOREIGN PATENT DOCUMENTS 0241271  10/1986  Japan ............................ 180/142

Primary Examiner—Charles A. Marmor
Assistant Examiner—Wook Yoon
Attorney, Agent, or Firm—Mark A. Navarre

[57] ABSTRACT

A hydraulic power steering system having conventional relatively rotatable spool and valve body elements for flow regulation, and an integral electromagnetic mechanism which effectively varies the centering force between the spool and valve body to adjust the level of steering assist provided for a given operator steering input. The electromagnetic mechanism comprises a rotary multipole permanent magnet supported for rotation with one of the spool and valve body elements, a rotary flux conducting element supported for rotation with the other of the spool and valve body elements, and a stationary exciting coil magnetically coupled thereto. The exciting coil is energized so as to produce a variable centering force between the spool and valve body with vehicle speed, which produces a corresponding variation in the driver steering effort.

14 Claims, 6 Drawing Sheets

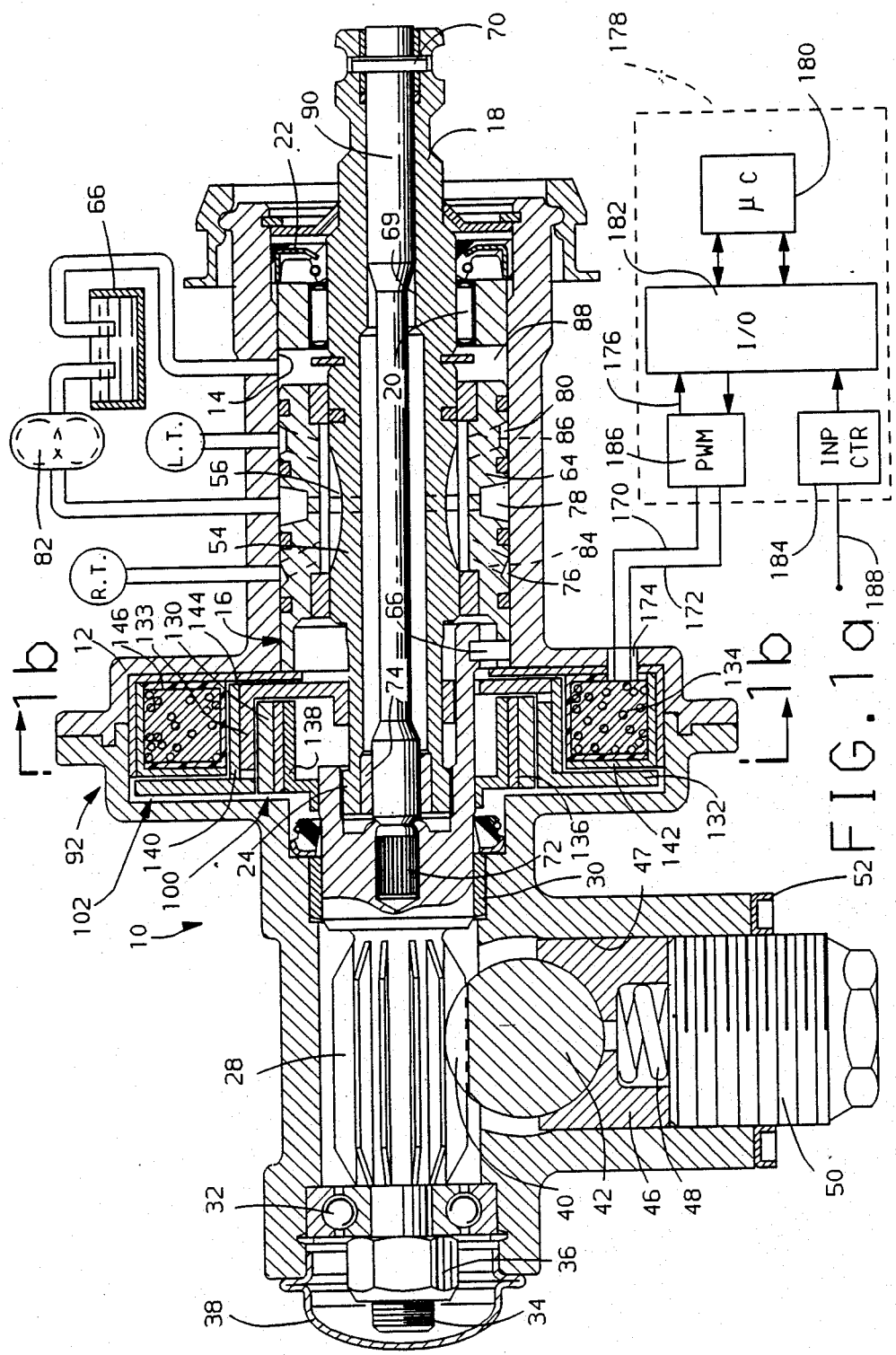

ELECTROMAGNETIC CONTROL APPARATUS FOR VARYING THE DRIVER STEERING EFFORT OF A HYDRAULIC POWER STEERING SYSTEM

This invention relates to an automotive hydraulic power assist steering system, and more particularly to an electromagnetic control apparatus for varying the driver steering effort required to produce a given level of power assist.

BACKGROUND OF THE INVENTION

The conventional hydraulic power assist steering system comprises a hydraulic actuator for moving the steering linkage in relation to the fluid flow supplied thereto, and a rotary hydraulic control valve assembly for controlling fluid flow to the actuator in relation to the operator exerted steering torque. The control valve generally includes a cylindrical valve body rotatable within the valve housing and a spool rotatably disposed within the valve body. Hydraulic fluid is supplied to a cavity formed in the spool, and the valve body is grooved to receive fluid flow in relation to the amount of relative rotation between spool and valve body. The fluid so received is then directed to the actuator so that steering assist is developed in relation to the relative rotation of the valve body and spool.

The spool is manually rotated by the operator of the vehicle and is connected to mechanically drive the steering linkage through a lost motion coupling. A resilient element, such as a torsion bar, couples the spool and valve body to provide a centering force for aligning the spool and valve body and to permit relative rotation therebetween in relation to operator exerted steering torque, at least within the limitations of the lost motion coupling.

In systems of the type described above, the level of driver steering effort assist required to produce a given level of power assist depends primarily on the compliance of the torsion bar. If the torsion bar has relatively high compliance, a relatively low level of driver steering effort is required. This is generally desirable in low speed operation of a vehicle where relatively high steering forces are required. If the torsion bar has relatively low compliance, a relatively high level of driver steering effort is required. This is generally desirable in high speed operation of a vehicle where relatively low steering forces are required.

To overcome the engineering trade-off described above, various arrangements have been proposed for varying the driver steering effort for a given level of power assist as a function of vehicle speed. An example of one such arrangement is given in U.S. Pat. No. 4,629,025, issued to Brasier et al., Dec. 16, 1986, and assigned to the assignee of the present invention. In that arrangement, a controlled portion of the hydraulic fluid pump output is returned to the reservoir of the pump to reduce fluid flow to the steering actuator with increasing vehicle speed.

SUMMARY OF THE PRESENT INVENTION

The present invention is directed to a hydraulic power assist steering system having conventional relatively rotatable spool and valve body elements for flow regulation, and an integral electromagnetic mechanism which defines a coupling of variable resilience between the spool and valve body for adjusting driver steering effort required to produce a given level of power assist.

The integral electromagnetic mechanism of this invention comprises first and second magnetic assemblies. The first magnetic assembly includes a rotary multipole permanent magnet ring supported for rotation with one of the spool and valve body elements. The second magnetic assembly includes a rotary flux conducting element supported for rotation with the other of the spool and valve body elements and a stationary exciting coil magnetically coupled thereto.

In the illustrated embodiments, the rotary permanent magnet of the first magnetic assembly is in the form of a ring magnet having N alternating polarity magnetic regions (poles) about its outer circumference, and the rotary flux conducting element of the second magnetic assembly is defined by a core piece magnetically coupled to the exciting coil and having N interleaved teeth or electromagnetic poles. Adjacent permanent magnet regions are magnetically coupled (either internally or by an external flux conducting ring), and the interleaved teeth of the rotary flux conducting element are disposed in close proximity to such regions to define a working air gap therebetween.

When the exciting coil is energized with direct current, the interleaved teeth define N alternating polarity electromagnetic poles which interact with the poles of the permanent magnet. The flux path circles the coil, passing through the electromagnetic and permanent magnet poles and the core piece of the rotary flux conducting element.

The electromagnetic and permanent magnet poles are oriented such that when the spool and valve body elements are centered and the exciting coil is energized with a first polarity of current, opposite polarity electromagnetic and permanent magnet poles are radially aligned. This produces an attractive force between the electromagnetic and permanent magnet poles, and a positive magnetic centering torque when there is relative displacement of the spool and valve body elements, which torque tends to restore the assembly to the centered position. When the coil is energized with current of the opposite polarity, the radially aligned electromagnetic and permanent magnet poles are of the same polarity. This produces a repulsive force between the electromagnetic and permanent magnet poles, and a negative magnetic centering torque when there is relative displacement of the spool and valve body elements, which torque tends to further displace the assembly. In either case, the magnitude of the magnetic centering torque is variable over a wide range depending on the magnitude of current supplied to the coil.

In the illustrated embodiment, the mechanism of this invention is used in combination with a conventional torsion bar to define a variable resiliency coupling between the hydraulic fluid supply elements. The torsion bar provides a mechanical centering torque which defines a coupling of intermediate resilience which tends to restore the assembly to the centered position when there is relative displacement of the spool and valve body elements. This generates an intermediate level of steering assist for a given driver steering input. Variably energizing the exciting coil with current of the first polarity produces positive magnetic centering torque which variably increases the resilience of the coupling so that more driver steering effort is required to produce a given level of power assist. Variably energizing the exciting coil with current of the opposite polarity produces negative centering torque which variably decreases the resilience of the coupling so that less driver steering effort is required to produce a given level of power assist. Preferably, the coil energization is scheduled in relation to the speed of the vehicle so that the level of steering assist decreases with increasing vehicle speed. A driver preference input may also be used.

BRIEF DESCRIPTION OF THE DRAWINGS

FIG. 1a is a sectional view of a hydraulic control valve assembly incorporating the integral electromagnetic mechanism of this invention, and a block diagram of a computer-based controller therefor.

DESCRIPTION OF THE PREFERRED EMBODIMENT

Figure 1B:
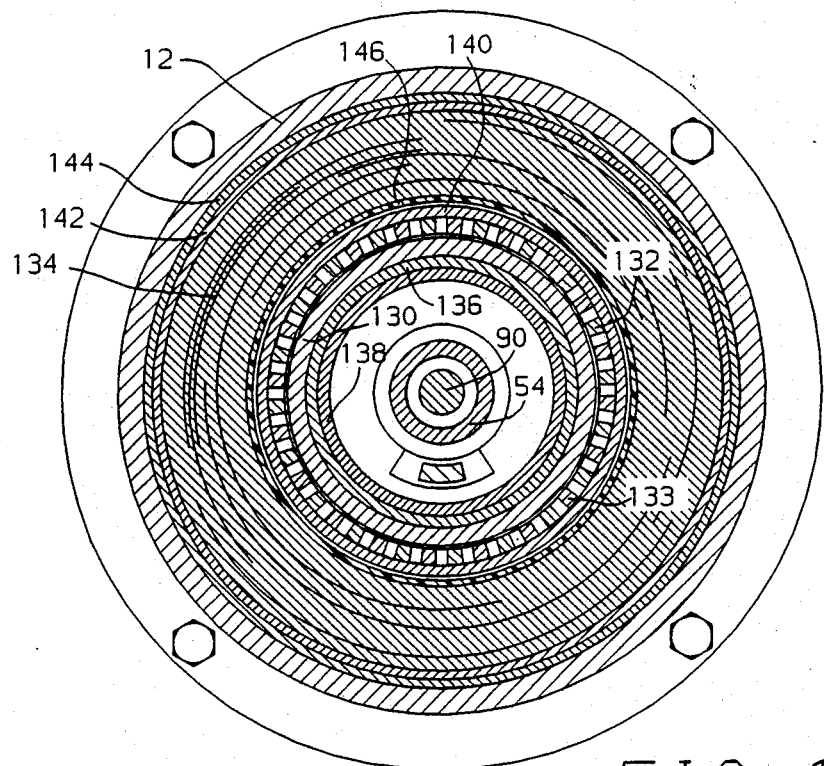
FIG. 1b is a section of the valve assembly of FIG. 1a along the line 1b—1b.
Figure 5:
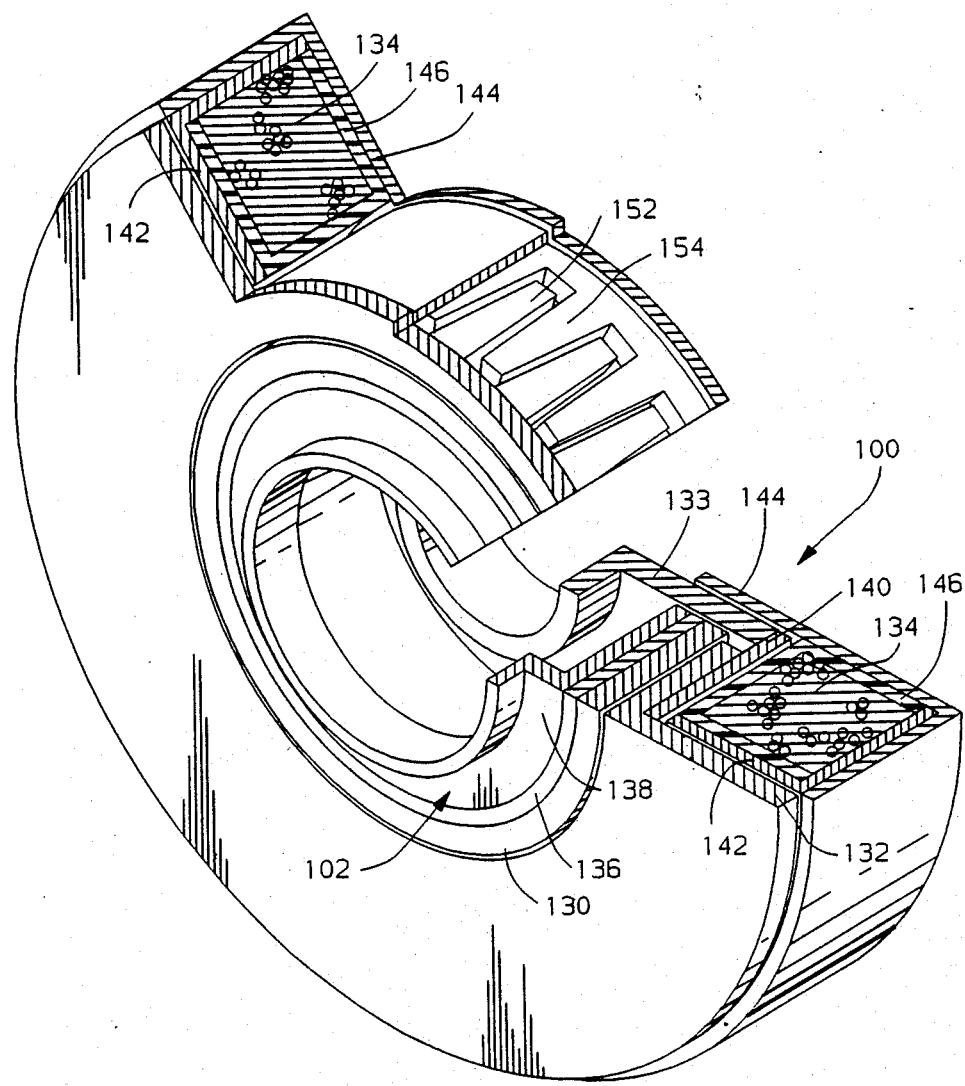
FIG. 5 is a perspective view of the electromagnetic mechanism of FIGS. 1a-1c.

Referring particularly to FIGS. 1a, 1b and 5, the reference numeral 10 generally designates a portion of a motor vehicle hydraulic power assist rack and pinion steering gear. The steering gear 10 is disposed within a two-piece housing 12 having a cylindrical smooth wall bore 14 formed therein. A cylindrical rotary power steering gear valve assembly 16 disposed within the bore 14 includes an elongated cylindrical spool shaft 18 mounted for turning movement in the housing 12 by a baring assembly 20. The inboard end of spool shaft 18 projects through an annular fluid seal 22 for connection to a conventional steering shaft and operator manipulated handwheel, not shown.

The outboard end of the spool shaft 18 is splined as indicated by the reference numeral 24 with an elongated pinion gear 28 to define a lost motion mechanical coupling therebetween. The pinion gear 28 is rotatably mounted in the housing 12 by the sleeve bearing 30 and a ball bearing assembly 32 which receives a shank portion 34 of pinion gear 28. A nut 36 threaded onto the outboard end of the shank portion 34 secures the pinion gear 28 with the housing 12. A cup-like cover 38 frictionally fits into the end of the housing 12 to provide service access.

The teeth of pinion gear 28 mesh with the toothed portion 40 of an elongated rack 42 mounted for linear sliding movement within the housing 12. The rack 42 is operatively connected to the steerable wheels of the vehicle by suitable ball joints and tie rods, not shown. In such an arrangement, the linear movement of the rack turns the steerable wheels of the vehicle for vehicle steering purposes.

The rack 42 is also coupled to a fluid operated power cylinder mechanism or actuator, not shown, for applying a steering assist force to rack 42. As described below, the power steering valve assembly 16 is adapted to direct hydraulic fluid to right or left turn chambers of the power cylinder to apply right-hand or left-hand steering assist force to rack 42. A power cylinder meeting the above description is described in detail in U.S. Pat. No. 4,454,801 to Spann, issued June 19, 1984, and assigned to the assignee of the present invention, such patent being incorporated herein by reference.

Close meshing engagement between the teeth of the pinion 28 and the rack 42 is achieved by the rack contact shoe 46 which is slidably mounted in the housing bore 47. A helical spring 48 seated between the contact shoe 46 and an adjusting plug 50, tensions the contact shoe 46. Plug 50 is threaded into the end of housing bore 47 and can be axially adjusted therein to vary the spring force. An adjuster plug nut 52 maintains the plug 50 in a selected position.

The spool shaft 18 of the power steering valve assembly 16 has a cylindrical valve spool 54 formed thereon. The spool 54 has a plurality of arcuate, axially extending oil transfer slots 56 formed in the periphery thereof. The valve assembly 16 also includes a cylindrical valve body 64 rotatably mounted within valve bore 14 on the valve spool 54. The outboard end of the valve body 64 extends over the end of the pinion 28 and is drivingly connected thereto by radial pin 66.

The valve body 64 defines right turn, supply and left turn chambers 76, 78, 80 between it and the valve bore 14. A hydraulic pump 82 supplies fluid to the supply chamber 78 and such fluid is directed to the right turn and left turn chambers 76, 80 via the slots 56 of valve spool 54 and the drilled passages 84 and 86, depending on the direction and degree of relative rotation between spool 54 and valve body 64. The right turn and left turn chambers 76, 80 are connected to the right (RT) and left (LT) chambers of the power cylinder (actuator) as indicated for generating a corresponding level of steering assist force in rack 42 as described above. An exhaust passage chamber 88 returns hydraulic fluid to the fluid reservoir 66 of pump 82. A detailed description of the valve 16 and the hydraulic system thereof is set forth in the above-referenced U.S. Pat. No. 4,454,801.

A resilient centering coupling between the valve spool 54 and valve body 64 is provided by the combined operation of a torsion bar 90 and the electromagnetic mechanism of this invention, generally designated by the reference numeral 92. Together, the torsion bar 90 and electromagnetic mechanism 92 permit the valve spool 54 to be rotated relative to the valve body 64 in relation to the operator exerted steering torque so that the valve 16 directs fluid to the power cylinder (not shown) for producing the desired level of steering assist force. On termination of the operator exerted steering torque, the torsion bar 90 and electromagnetic mechanism 92 center the valve body 64 and spool 54 to terminate steering assist force.

The torsion bar 90 extends concentrically through an axial opening 69 in the spool shaft 18. A cross pin 70 connects the input end of torsion bar 90 to spool shaft 18. The output end of torsion bar 90 is splined and staked at 72 to the pinion 28. Bearing sleeve 74 supports the inner end of the spool shaft 18 on a cylindrical portion of the torsion bar 90.

The electromagnetic mechanism 92 comprises first and second magnetic assemblies generally designated by the reference numerals 100 and 102. The first magnetic assembly 100 includes a rotary multipole permanent ring magnet 130 supported for rotation with the pinion 28 and valve body 64. The second magnetic assembly 102 includes a pair of rotary flux conducting core elements 132, 133 supported for rotation with the valve spool 54 and a stationary exciting coil 134 magnetically coupled thereto.

Figure 1C:
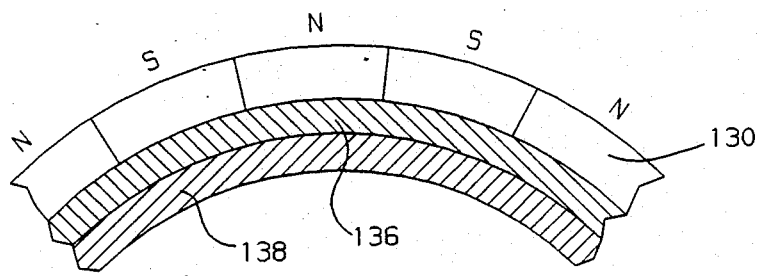
FIGS. 1c and 1d depict alternate permanent magnet configurations.

The ring magnet 130 is radially magnetized to define N alternating polarity permanent magnetic poles about its outer circumference. This may be achieved with a radially magnetized magnet 130, as schematically depicted in FIG. 1c, supported on a flux conducting backing ring 136. The backing ring 136 magnetically couples opposite polarity poles of the permanent magnet 130. The combination of the magnet 130 and backing ring 136 is supported for rotation with the valve body 64 on a nonmagnetic hub 138, which is secured to the inboard end of the pinion 28.

Figure 1D:
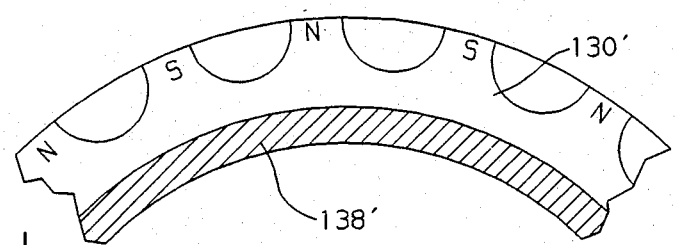

Alternatively, the magnet 130 may be internally magnetized as schematically depicted in FIG. 1d in a series of U-shaped patterns so that all of the magnetic poles are defined on the outer circumference of the magnet. In this case, a flux conducting backing ring, such as the ring 136 of FIG. 1c, is not required and the magnet 130 may be supported directly on a nonmagnetic hub such as the hub 138.

The rotary flux conducting core elements 132, 133 of the second magnetic assembly 102 are mechanically coupled by a nonmagnetic ring 140. The core piece 133 is secured to the valve spool 54 to support the core element assembly for rotation therewith. The core piece 132 is magnetically coupled to the exciting coil 134 via the stationary pole piece 142, and the core piece 133 is magnetically coupled to the exciting coil 134 via the stationary pole piece 144. The coil 134 is wound in an insulating bobbin 146, and has lead ends 170, 172 passing through a suitable opening 174 in the housing 12 for connection to the computer-based control unit 178, described below.

As best seen in the perspective view of FIG. 5, the core elements 132, 133 each have N/2 axially extending claw-pole teeth 152, 154 which interleave to define a total of N electromagnetic poles. The teeth 152, 154 are disposed in close proximity to the outer radial circumference of the ring magnet 130, defining a working air gap therebetween. When the exciting coil 134 is energized with direct current of a first polarity, the teeth 152, 154 assume alternate magnetic polarities as indicated in the linearized representations of FIGS. 2a-2d, and magnetic flux flows in a flux path comprising the magnet 130 and backing ring 136, the rotary core element 132, (via teeth 152), the stationary pole pieces 142, 144 and the rotary core element 133 (via teeth 154). The radially attractive magnetic forces are balanced due to symmetry.

Figure 2A:
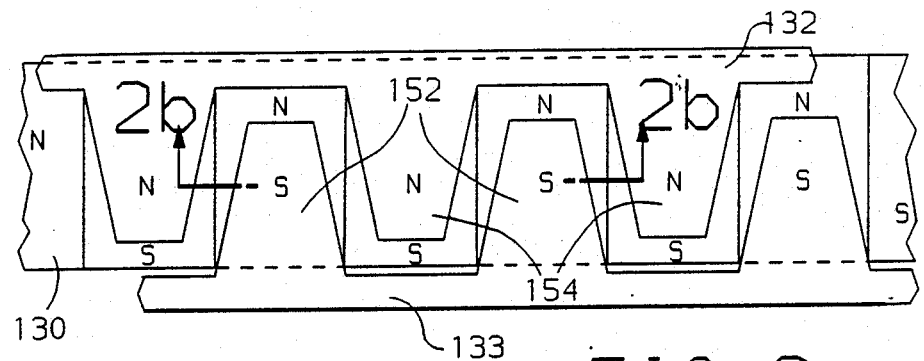
FIGS. 2a-2d schematically depict linearized views of the electromagnetic and permanent magnet poles of the mechanism depicted in FIGS. 1a-1c.
Figure 2B:
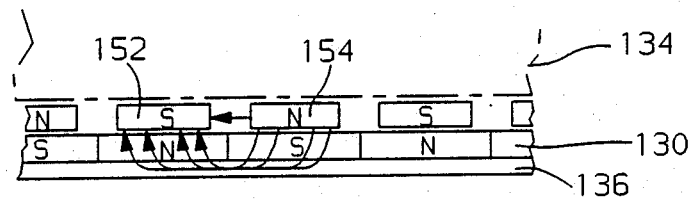

Referring to FIGS. 2a and 2b, the first and second magnetic assemblies 100, 102 are angularly oriented such that when the spool and valve body 54, 64 are centered and the exciting coil 134 is energized with current of the first direction, the various teeth 152, 154 are facing and radially aligned with permanent magnet poles of opposing polarities. As seen in the cross section of FIG. 2b, the flux circles the coil 134, crossing the working air gap between the North (N) polarity teeth 154 and the South (S) polarity permanent magnet poles, through the backing ring 136, and back across the working air gap between the North (N) polarity permanent magnet poles and the South (S) polarity teeth 152. This state is magnetically preferred because it presents the lowest reluctance path for the magnetic flux.

Figure 2C:
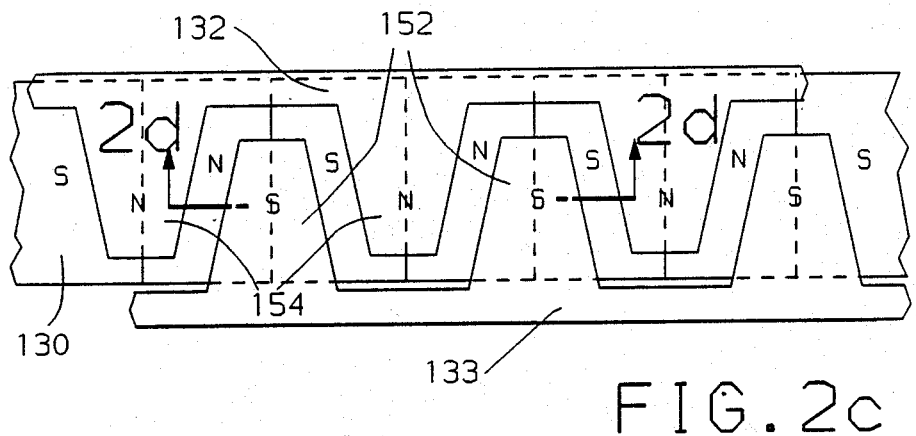
Figure 2D:
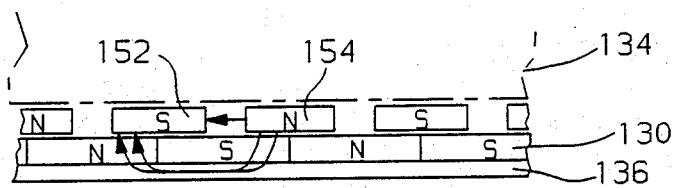

However, when there is relative rotation of the spool and valve body elements 54, 64, opposite polarity teeth 152, 154 and permanent magnet poles become radially misaligned as depicted in FIG. 2c. This increases the reluctance of the flux path as indicated by the flux lines in FIG. 2d, and thereby results in the production of a positive magnetic centering torque which tends to restore the assembly to the preferred or centered position.

Analogously, the radially aligned electromagnetic and permanent magnet poles are of like polarity when the coil is energized with current of a second or opposite direction. This produces a repulsive force between the electromagnetic and permanent magnet poles which generates a negative magnetic centering torque when there is relative displacement of the spool and valve body elements which tends to further displace the assembly.

The magnitude of the magnetic centering torque (positive or negative) varies substantially sinusoidally in relation to the degree of misalignment, or relative displacement of the spool and valve body elements 54, 64 and the current supplied to the exciting coil 134. In the illustrated embodiment, the coil current is scheduled in relation to the vehicle speed to provide a speed-dependent relationship between the operator input torque and the power assist torque.

Figure 3:
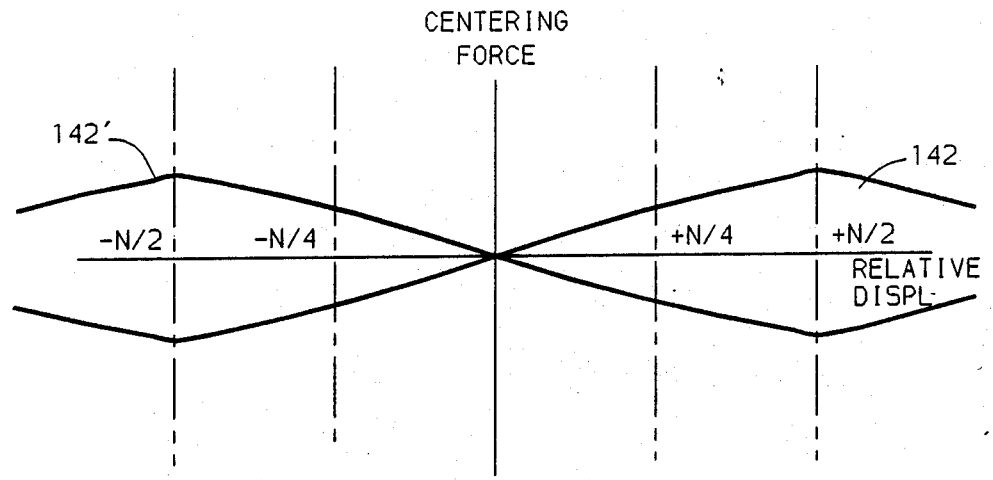
FIG. 3 depicts the centering force generated by the electromagnetic mechanism of FIG. 1 as a function of steering shaft rotation for a given coil current.

FIG. 3 graphically depicts the magnetic centering torque for a given coil current magnitude as a function of relative displacement. The trace 142 depicts positive centering torque and corresponds to coil current of a first direction. Trace 142' depicts negative centering torque and corresponds to coil current of the opposite direction. For the illustrated embodiment where the number of poles N is 40, the force peaks at approximately ±4.5 mechanical degrees of relative rotation. Further relative rotation is prevented by the lost motion spline coupling between spool shaft 18 and pinion gear 28.

The effective resiliency of the coupling between valve spool 54 and valve body 64 is determined by the sum of the mechanical centering forces of the torsion bar 90 and the magnetic centering force of the electromagnetic apparatus of this invention. The combined centering force is depicted as a function of relative displacement in FIG. 4. The torsion bar centering force is fixed for a given installation, but the magnetic centering force is variable with the exciting coil energization current magnitude and direction, and results in an overall centering force as represented by the family of curves shown in FIG. 4, and described below.

The computer-based control unit 178 of FIG. 1 is supplied with operating power from the vehicle storage battery (not shown), and comprises a microcomputer (uC) 180, an input/output (I/O) device 182, an input counter (INP CTR) 184, and a pulse-width-modulation driver (PWM) 186, all of which may be conventional devices. The microcomputer 180 communicates with the remainder of the system via I/O device 182; in response to various input information, microcomputer 180 executes a series of predetermined program instructions for developing an output command pertaining to the required energization of the exciting coil 134. Program instructions are described below in reference to the flow diagram of FIG. 6.

The primary control unit input is an oscillatory vehicle speed signal on line 188, which may be obtained from a conventional speed pickup, not shown. The speed signal is applied to the I/O device 182 through the input counter 184, which divides the frequency of the speed signal by a predetermined factor. The PWM command for exciting coil 134 is applied to a bidirectional PWM driver 186 (which may take the form of a conventional H-switch driver) for correspondingly modulating the coil 134 with current from the vehicle storage battery, not shown. A signal indicative of the coil current is developed by the PWM driver 186 on line 176 with a suitable current shunt, such signal being applied as an input to an analog port of the I/O device 182 for use in a closed-loop control of the coil current. Open-loop voltage control may alternately be employed, if desired.

Figure 4:
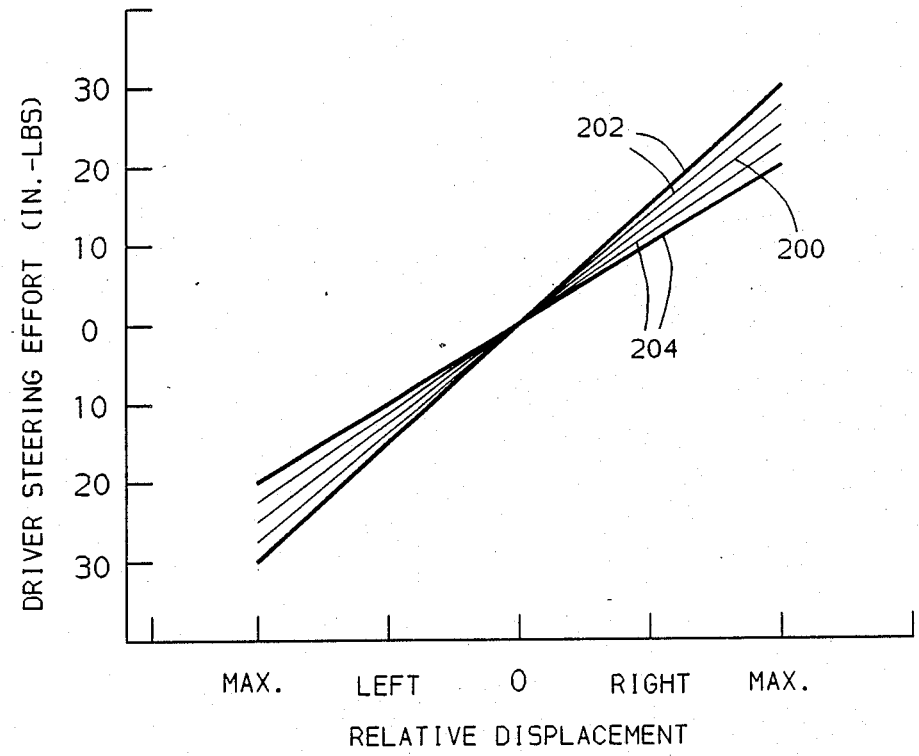
FIG. 4 depicts the variation in driver steering effort achieved by the control valve and controller of FIG. 1 for various vehicle speeds.

According to the illustrated embodiment, the combined effect of the torsion bar 90 and the magnetic centering force produces an intermediate level of steering assist, represented by the trace 200 in FIG. 4. This level of assist is most suitable for an intermediate vehicle speed such as 30 miles per hour. With increasing vehicle speed, the control unit 178 begins energizing the exciting coil 130 with progressively increasing levels of a first polarity current to increase the driver steering effort per unit relative displacement of the valve spool 54 and valve body 64, as indicated by the traces 202. With decreasing vehicle speed, the control unit 178 begins energizing the exciting coil 134 with progressively increasing levels of the opposite polarity current to reduce the driver steering effort per unit relative displacement of the valve spool 54 and valve body 64, as indicated by the traces 204. This produces a variable effort effect since the level of power assist is directly related to the relative displacement of the valve spool 54 and valve body 64.

The maximum relative displacement limits (MAX) are defined by the splined lost motion coupling between spool shaft 18 and pinion gear 28. Once the maximum displacement has occurred, further rotation of the steering wheel is mechanically transmitted to the pinion gear 28 via the coupling. In the illustrated embodiment, the coupling permits relative displacements of approximately ±4.5 mechanical degrees, the region over which the slope of the magnetic centering force is positive—that is, the region over which increased relative displacement produces increased magnetic centering force.

It should be recognized, of course, that alternative control methods may be employed. For example, the torsion bar 90 could be omitted entirely, or designed so that the combination of its centering force and the magnetic centering force provides an extreme level of steering assist. In either of such approaches, the control unit 178 would effect unidirectional current control of the exciting coil 134 to adjust the overall resilience of the valve body/spool coupling, and the bidirectional PWM driver 186 could be replaced with a unidirectional driver.

Figure 6:
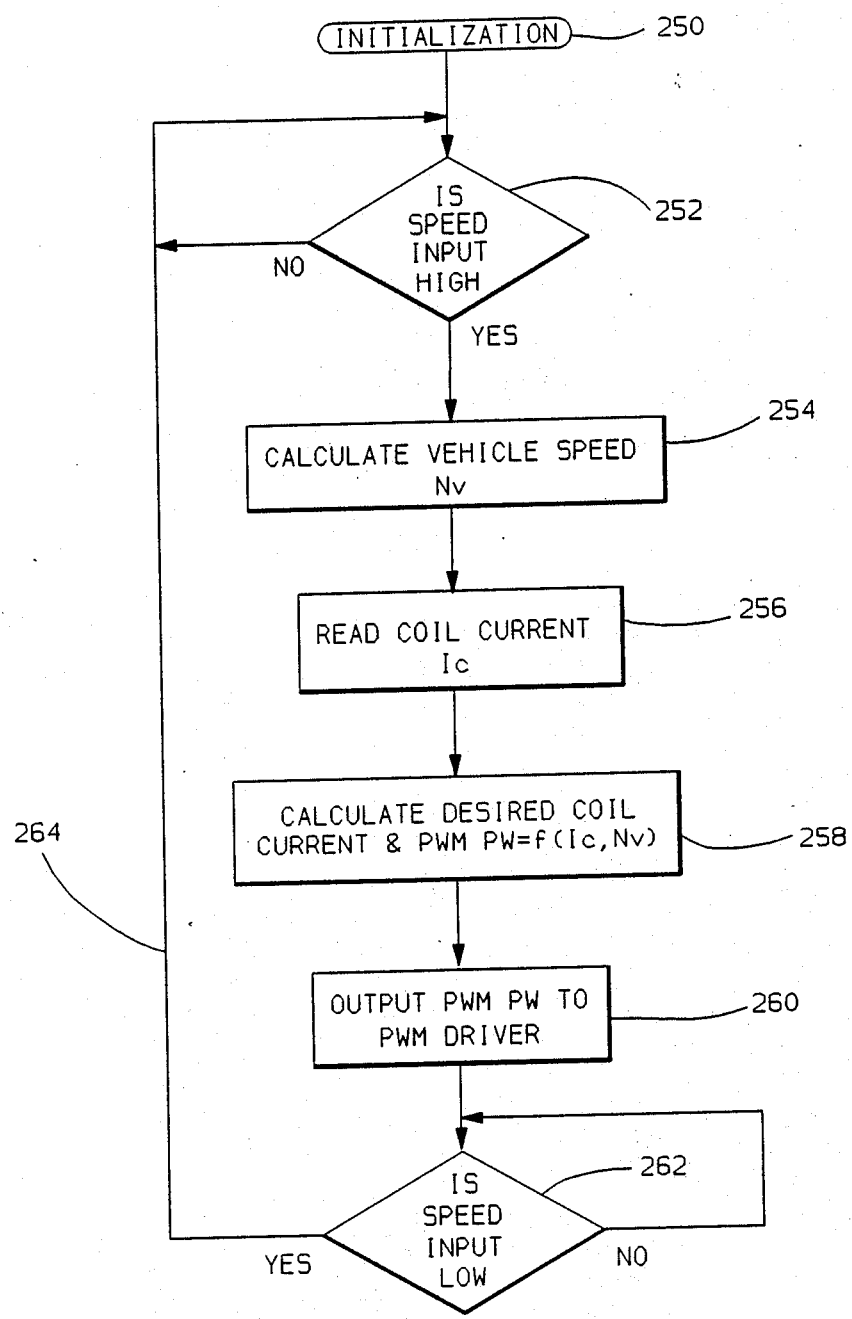
FIG. 6 is a flow diagram representative of computer program instructions executed by the computer based controller of FIG. 1a in controlling the excitation of the electromagnetic mechanism of this invention.

Regardless of the control method employed, FIG. 6 depicts a simplified flow diagram representative of computer program instructions which would be executed by the computer-based control unit 178 of FIG. 1 in carrying out the control. The block 250 designates a series of program instructions executed at the initiation of each period of vehicle operation for initializing the various registers and program variable to predetermined values. Thereafter, the blocks 262-272 are executed as explained below.

The decision blocks 262 and 272 detect a low to high transition of the vehicle speed signal output of input counter 184. When the transition is detected, the instruction blocks 264, 266, 268 and 270 are sequentially executed to calculate the vehicle speed $N_v$, to read the coil current value $I_c$, and to calculate and output a PWM pulse width to the PWM driver 186. Calculation of the vehicle speed at block 264 is based on the elapsed time between low-to-high transitions of the input counter carry bit, such time being inversely proportional to vehicle speed $N_v$. Calculation of the PWM pulse width command is based on the deviation of the desired coil current from the measured coil current $I_c$, the desired current being determined in accordance with vehicle speed, as indicated in FIG. 4.

While this invention has been described in reference to the illustrated embodiment, various modifications will occur to those skilled in the art. In essential form, the control apparatus of this invention comprises relatively rotatable electromagnetic and permanent magnet circuits. The function of the circuits can be achieved with alternate (such as disk) configurations, and it should be understood that the scope of this invention is defined solely by the appended claims. Moreover, various control parameters, such as driver preference (light, medium, or heavy effort) or pressure feedback may be used, either separately or in combination with the above-described vehicle speed parameter.

The embodiments of the invention in which an exclusive property or privilege is claimed are defined as follows:

1. In a vehicular power assist steering system wherein a pair of relatively rotatable hydraulic elements are connected between a driver manipulated steering shaft and a steering gear for generating hydraulic flow in relation to their relative rotation, apparatus for rotatably coupling said hydraulic elements, comprising:
   permanent magnetic means supported for rotation with one of said pair of hydraulic elements to define a rotary set of alternate polarity permanent magnetic poles, and electromagnetic means including an energized coil and an encircling core having a set of alternate polarity electromagnetic pole elements disposed in close proximity to said permanent magnetic poles, the electromagnetic pole elements being supported for rotation with the other of said pair of hydraulic elements relative to said permanent magnetic poles such that the minimum reluctance flux path therebetween occurs when said hydraulic elements are in a centered relation for minimum hydraulic flow, whereby when said hydraulic elements are relatively displaced from said centered relation, the reluctance of said flux path is increased, resulting in the production of a magnetic centering torque which tends to restore said hydraulic elements to such centered relation.

2. The apparatus set forth in claim 1, additionally including a resilient element mechanically coupling the rotary hydraulic elements to develop a mechanical centering force which is rotationally balanced in the centered relative position of said rotary magnetic elements, but which resists relative rotation therefrom, whereby the overall coupling between the hydraulic elements is defined by the combination of said magnetic and mechanical centering forces.

3. The apparatus set forth in claim 2, wherein the resilient element is a torsion bar.

4. The apparatus set forth in claim 1, including:
   control means for varying the energization of said coil, thereby to correspondingly vary the magnitude of the magnetic centering force for a given relative displacement of said hydraulic elements.

5. The apparatus set forth in claim 4, wherein:
the control apparatus varies the coil energization in relation to the speed of the vehicle, whereby relative rotation of said hydraulic elements, and hence the hydraulic flow, for a given driver manipulation of said steering shaft varies with the speed of the vehicle.

6. In a vehicular power assist steering system wherein a pair of relatively rotatable hydraulic elements are connected between a driver manipulated steering shaft and a steering gear such that driver steering effort applied to said steering shaft produces a relative rotation of said hydraulic elements for generating hydraulic flow in relation to the desired level of power assist steering force, apparatus for rotatably coupling said hydraulic elements, comprising:
permanent magnetic means supported for rotation with one of said pair of hydraulic elements to define a rotary set of alternate polarity permanent magnetic poles;
electromagnetic means including an energized coil and an encircling core having a set of alternate polarity electromagnetic pole elements disposed in close proximity to said permanent magnetic poles, the electromagnetic pole elements being supported for rotation with the other of said pair of hydraulic elements relative to said permanent magnetic poles such that the minimum reluctance flux path therebetween occurs when said hydraulic elements are in a centered relation for minimum hydraulic flow, whereby when said hydraulic elements are relatively displaced from said centered relation, and the coil is energized with current of a first direction, the electromagnetic and permanent magnet poles cooperate to produce a positive magnetic centering torque which tends to restore said hydraulic elements to such centered relation; and
control means for varying the magnitude of said coil current to correspondingly vary the magnitude of the magnetic centering force for a given relative displacement of said hydraulic elements, whereby the driver steering effort required to produce a given relative rotation of said hydraulic elements, and hence a given level of power steering force, is variable with such coil energization.

7. The apparatus set forth in claim 6, additionally including a resilient element mechanically coupling the rotary hydraulic elements to develop a mechanical centering force which is rotationally balanced in the centered relative position of said rotary magnetic elements, but which resists relative rotation therefrom, whereby the overall coupling between the hydraulic elements is defined by the combination of said magnetic and mechanical centering forces.

8. The apparatus set forth in claim 6, wherein:
the control means varies the coil energization in relation to the speed of the vehicle so that the driver steering effort required to produce a given relative rotation of said hydraulic elements, and hence a given level of power steering force, is variable with the vehicle speed.

9. In a vehicular power assist steering system wherein a pair of relatively rotatable hydraulic elements are connected between a driver manipulated steering shaft and a steering gear such that driver steering effort applied to said steering shaft produces a relative rotation of said hydraulic elements for generating hydraulic flow in relation to the desired level of power assist steering force, apparatus for rotatably coupling said hydraulic elements, comprising:
mechanically resilient means coupling the rotary hydraulic elements to develop a mechanical centering force which is rotationally balanced in the centered relative position of said rotary magnetic elements, but which resists relative rotation therefrom;
permanent magnetic means supported for rotation with one of said pair of hydraulic elements to define a rotary set of alternate polarity permanent magnetic poles;
electromagnetic means including an exciting coil and an encircling core having a set of alternate polarity electromagnetic pole elements disposed in close proximity to said permanent magnetic poles, the electromagnetic pole elements being supported for rotation with the other of said pair of hydraulic elements relative to said permanent magnetic poles such that the minimum reluctance electromagnetic flux path therebetween occurs when said hydraulic elements are in a centered relation for minimum hydraulic flow; and
control means for energizing said exciting coil with direct current to control the magnetic polarity and strength of said electromagnetic poles, whereby the electromagnetic and permanent magnet poles cooperate to produce a variable magnetic centering torque in relation to the displacement of said hydraulic elements and the energization of said exciting coil, and the overall coupling between the hydraulic elements is defined by the combination of said magnetic and mechanical centering torques.

10. The apparatus set forth in claim 9, wherein:
the control means varies the coil energization in relation to the speed of the vehicle so that the driver steering effort required to produce a given relative rotation of said hydraulic elements, and hence a given level of power steering force, is variable with the vehicle speed.

11. The apparatus set forth in claim 10, wherein:
the mechanically resilient means defines a relatively low mechanical centering torque for producing a relatively high level of steering assist flow suitable for relatively low vehicle speeds; and
the control means energizes the exciting coil with current of a direction for producing magnetic centering torque which aids the mechanical centering torque for vehicle speeds above said relatively low vehicle speeds, thereby increasing the overall coupling between the hydraulic elements and reducing the steering assist flow with increasing speed of the vehicle.

12. The apparatus set forth in claim 10, wherein:
the mechanically resilient means defines a relatively high mechanical centering torque for producing a relatively low level of steering assist flow suitable for relatively high vehicle speeds; and
the control means energizes the exciting coil with current of a direction for producing magnetic centering torque which opposes the mechanical centering torque for vehicle speeds below said relatively high vehicle speeds, thereby decreasing the overall coupling between the hydraulic elements and increasing the steering assist flow with decreasing speed of the vehicle.

13. The apparatus set forth in claim 9, wherein:
the control means is adapted to energize the exciting coil with current of a first direction to produce magnetic centering torque which aids the mechanical centering torque to increase the overall coupling between the hydraulic elements, and current of the opposite direction to produce magnetic centering torque which opposes the mechanical centering torque to decrease the overall coupling between the hydraulic elements.

14. The apparatus set forth in claim 13, wherein:
the coupling defined by the mechanical centering torque establishes an intermediate level of steering assist flow suitable for an intermediate vehicle speed; and the control means energizes the exciting coil with current (1) of said first direction for vehicle speeds above said intermediate speed for increasing the overall coupling to reduce the steering assist flow for a given driver steering effort, and (2) of said opposite direction for vehicle speeds lower than said intermediate speed for decreasing the overall coupling to increase the steering assist flow for a given driver steering effort.

* * * * *